INVENTOR
JOHANN GERHARD ZIRWAS

BY [signature] ATTORNEYS

March 4, 1969 J. G. ZIRWAS 3,431,507

AMPLIFIER WITH TEMPERATURE COMPENSATION LYING IN THE FEEDBACK PATH

Filed Sept. 24, 1965 Sheet 2 of 3

INVENTOR
JOHANN GERHARD ZIRWAS

BY Spiel & Spiel ATTORNEYS

INVENTOR
JOHANN GERHARD ZIRWAS

BY Spiee & Spiee ATTORNEYS

United States Patent Office 3,431,507
Patented Mar. 4, 1969

3,431,507
AMPLIFIER WITH TEMPERATURE COMPENSATION LYING IN THE FEEDBACK PATH

Johann Gerhard Zirwas, Unterpfaffenhofen, Germany, assignor to Siemens Aktiengesellschaft, a corporation of Germany Filed Sept. 24, 1965, Ser. No. 490,138
Claims priority, application Germany, Sept. 28, 1964, S 93,385
U.S. Cl. 330—23 1 Claim
Int. Cl. H03f 1/32, 3/04, 1/38

ABSTRACT OF THE DISCLOSURE

A magnetic-field-dependent resistor mounted in the feedback path of a line amplifier, the n-doping of the resistor being so selected that its temperature characteristic as well as the adjusting range achievable through it in a predetermined range satisfies the respective regulating function for the amplifier.

Figure 1:
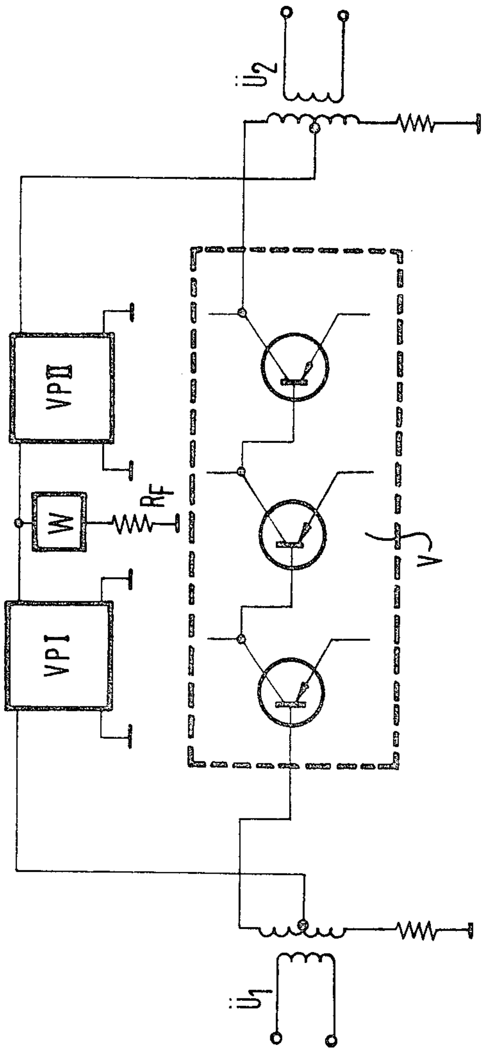

The invention relates to an amplifier, and specifically to a line amplifier with temperature compensation lying in the feedback path for electrical transmission systems.

On carrier frequency lines, it is necessary to keep the sending level of the line amplifiers always close to the desired value, since otherwise noise in the message transmission would become inadmissibly great. For this purpose, the amplification of each individual line amplifier must in each case correspond to the attenuation of the preceding line section. In the frequency range of carrier frequency technology, the cable attenuation increases with the square root of the frequency. The amplification of the line amplifier must, therefore, have the same frequency characteristic. Since the line amplifiers, for reasons of stability and linearity, are strongly fed-back it is usual and expedient to determine the desired frequency characteristic in the feedback path, for example, by a distortion-clearing four-pole.

The amplification must, moreover, be variable within certain limits also according to the square root-frequency characteristic. There are two reasons for this:

On the one hand, different line lengths will always occur between the amplifiers, since the housing of the amplifiers is arbitrarily selected. On the other hand, the temperature of the line fluctuates according to the season of the year. For this reason a corresponding fluctuation in attenuation results which cannot be neglected. Four-poles are placed in the feedback path for controlling amplification. It is, however, more effective to provide a regulating bipole in the feedback path, the reactances of the bipole, which approximate the frequency characteristic of the change in amplification, providing the desired square-root frequency characteristic, while the range of the change in amplification can be adjusted by means of the value of an ohmic regulating resistor.

It is a known practice to provide as adjusting member and externally heated hot conductor (thermistor), whose heating current is adjusted by a more or less complicated control circuit. Both the final setting for the line adaptation and also the temperature-conditioned readjustment of the amplification are accomplished by means of the heating current of the hot conductor. The dependence of the externally heated hot conductor on its environmental temperature must then, as far as possible, be excluded. With this solution of the problem a number of drawbacks are involved, which is more evident in the case of line amplifiers having transistors. The power requirement of the hot conductors assumes an importance in the case of remote-current-supplied line amplifiers having transistors, since their power requirement has a similar order of magnitude. The message transmission depends on the faultless functioning of the control circuit, in which, in unfavorable cases, the troublesome effects accumulate, since the line amplifiers are connected in series on the transmission line.

In the case of underground housing of the amplifiers, the temperature control can be accomplished directly by means of the environmental temperature of the amplifiers, since the temperature of the line and the environmental temperature of the amplifiers are sufficiently close with suitable housing. As a result, devices have been designed in which the ohmic regulating resistance consists of a temperature-dependent and non-temperature dependent resistors connected together. The latter have to be inserted for the purpose of line compensation. Such devices have the drawback that the nontemperature-dependent resistors influence the action of the temperature-dependent resistor and the temperature-dependent resistor reduces the efficiency of the other resistor, resulting in a disagreeably large adjusting range for the latter; and, in the case of relatively great shifts, the whole combination has to be exchanged for another one.

Transistors are practically free of wear, very small and require little energy. For this reason, line amplifiers with transistors and their auxiliary devices for remote current supply are free of maintenance and much smaller than corresponding tube units. It is commonly known to bury such line amplifiers, together with the cable, in the ground. Thus, repairs to these units become time-consuming, difficult and expensive. The requirements, high in any case, for the reliability become still more important to maintain the quality of the units. In this connection it is a decisive advantage if the units can satisfactorily perform with as few as possible functionally essential structural parts.

The object of the invention is to make possible the adjustment of the amplifiers for a certain line length and the compension for the seasonal temperature changes on the lines in a simple manner.

According to the invention, an amplifier is constructed in such a manner that a magnetic field-dependent semiconductor resistor is connected in the feedback path as an adjusting member, which consists of an oriented, solidified eutectic mixture of indium antimonide-nickel antimonide and whose n-doping is selected in such a way that both its temperature characteristic and also the adjusting range achievable through it in a given range largely satisfies the regulating function at any time for the amplifier. Accordingly, the n-doping can be chosen in such a way that the conductivity of the semiconductor lies between 180 Ω-cm. and 600 Ω-cm. The magnetic field-dependent semiconductor resistor has a frequency-dependent resistor connected to its input which gives to the amplifier a frequency characteristic which is the same as the frequency characteristic of a length of line connected at the input. If the amplifier is used underground, then it is also expedient to arrange the adjusting member in the regulating circuit of the amplifier, since the influences of the temperature of the line on the attenuation of the proceding line amplifier can then be absorbed by the temperature sensitivity of the adjusting member, so that the regulating circuit is unaffected. The adjusting range can then be fully utilized for the elimination of unforeseen faults in the level.

As a result, the problem can be solved with the use of only one circuit element, which is absolutely the least possible number of elements. Moreover, it is advantageous to have a magnetic-field-dependent resistor in each amplifier that has sufficient temperature dependence to provide the necessary adjustment. Further, a continuous adjustability of the amplification is achieved. An optical indicator can be connected easily to the amplifier, and the control through the current supply is dispensed with. Since the magnetic field-dependent resistor is continuously effective during amplification, advantages result from this design of the adjusting member, such as, reduction of the size of a necessary magnet, etc.

Figure 2:
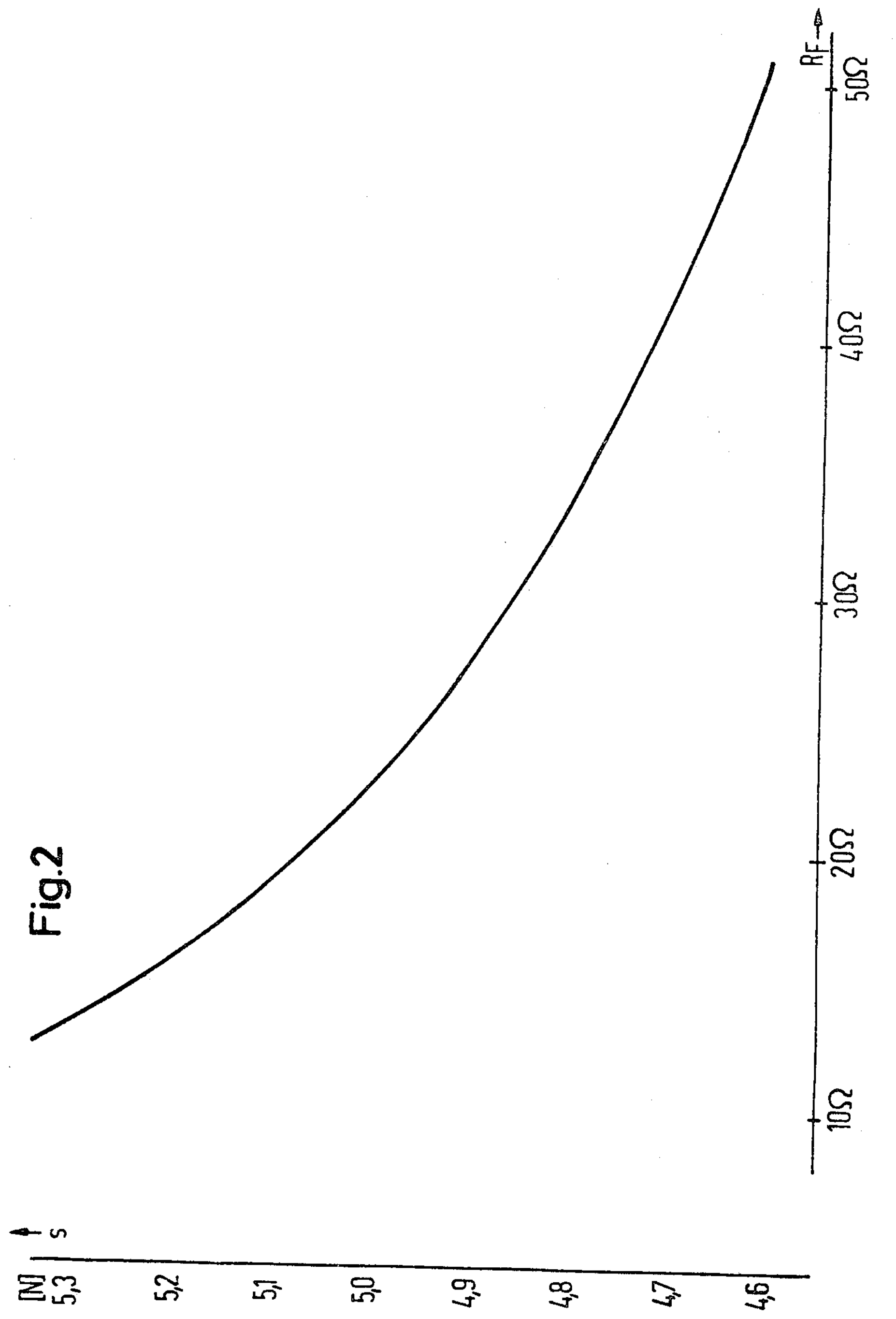
Figure 3:
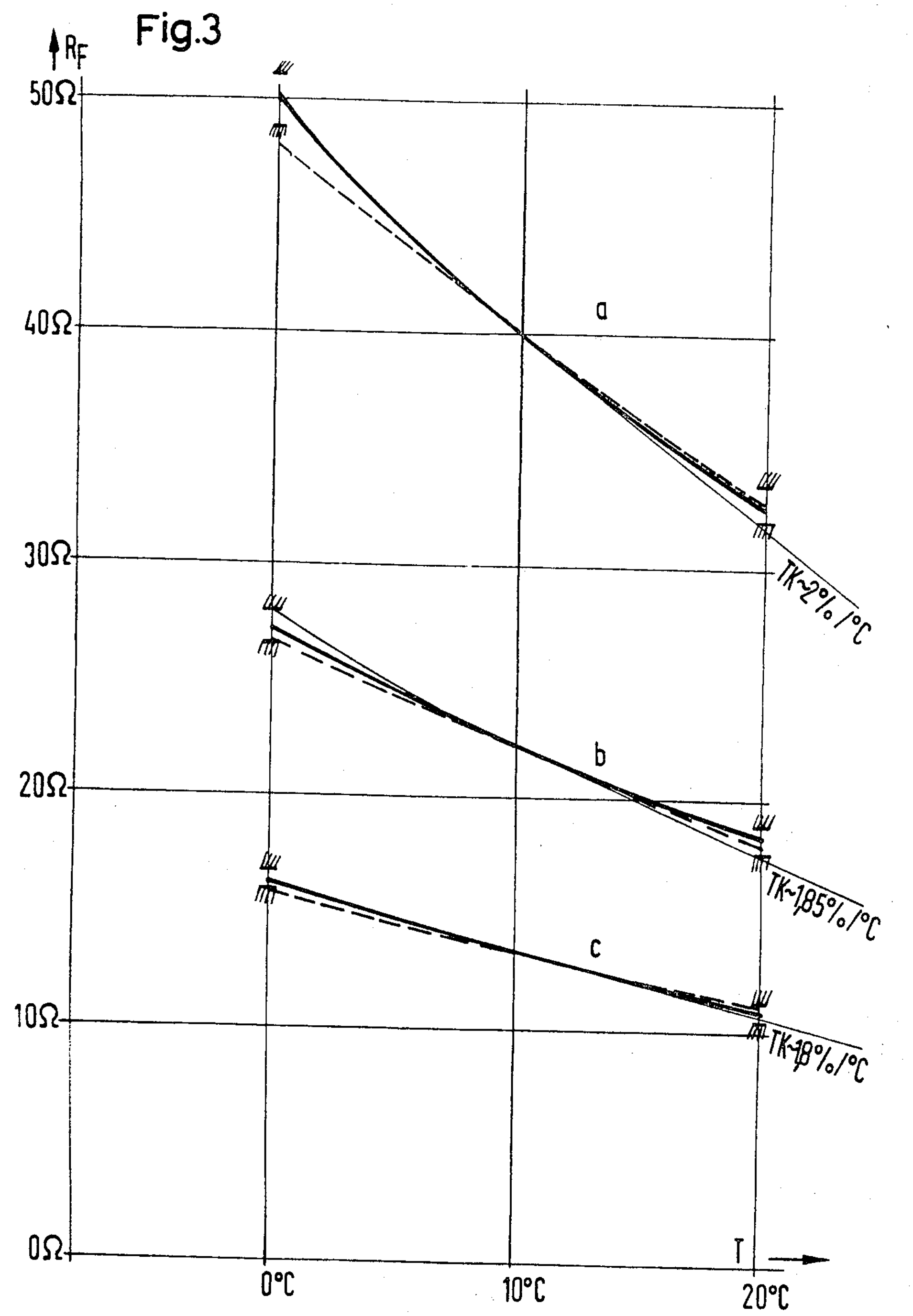

Other objects, advantages and features will become more apparent with the teaching of the principles of the present invention in connection with the disclosure of the preferred embodiment thereof in the specification, claim and drawings, in which:

FIGURE 1 is a block circuit diagram embodying the principles of the present invention; and FIGURES 2 and 3 are graphs to better understand the present invention.

As shown on the drawings:

FIGURE 1 shows the block circuit diagram of a carrier frequency line amplifier with the amplifier part V and the transformers $U_1$ and $U_2$. The four-poles VPI and VPII are connected in the feedback path. These determine the general frequency characteristic of the amplification. For the adjustment of the amplification, a regulating resistor R is provided. The size of this resistor determines the ranges of amplification, while through the reactances in the regulating bipole W, the frequency characteristic of the amplification is established. For the regulating characteristic and temperature control, the functional relationship between the size of R and the amplification is important. For this reason, the following approximate functional relationship was developed: $f(x)=1/x$. This function between the amplification change and the field plate resistance $R_F$ of the magnetic field-dependent semiconductor is represented in FIGURE 2 for a frequency of 4 mc.

Through suitable dimensioning of the feedback four-poles VPI and VPII, it is possible to determine the desired amplification range and the corresponding regulating range of the resistor R more nearly on the steep or the flat portion of this function. As a result, the adjusting range of the adjusting member and the required temperature range of the setting member each make opposing demands.

In view of the desired relation, at a temperature range of the line of approximately plus or minus 10° C., the temperature-conditioned attenuation changes amount to approximately plus or minus 0.1N. The amplification, according to the line length, at 10° C. may be between 4.7 and 5.3N, which lies either close to the lower or close to the upper end of the adjusting range. Therefore, according to FIGURE 2 a differing temperature sensitivity of $\pm R/°$ C. is necessary for the desired amplification change of 0.1N/10° C. at various settings of the adjusting member, and for example, with great resistance, that is, strong magnetic field, the temperature sensitivity must become greater and vice versa.

Through the calculations according to the invention, the suitable magnitude of the temperature dependence and also, largely, the desired magnetic field dependence are obtained. Referring now to FIG. 3, resistance versus temperature is plotted in a graph for three different amplification adjustments. The tolerance limits for an error of the temperature control of plus or minus 0.01N are likewise included. The solidly drawn curve represents in each case the desired characteristic and the curve drawn in broken lines represents the characteristic achieved by means of the invention. The curve *a* is shown for a low amplification setting, the curve *b* for a medium amplification setting, the curve *c* for a high amplification setting. The conductivity of the field plate of the magnetic field-dependent semiconductor resistor is preferably equal to 270 Ω-m. The calculations were made for amplifiers which are used in a multichannel-four-wire carrier frequency system for 960 channels per line.

The drawings and specification present a detailed disclosure of the preferred embodiment of the invention, and it is to be understood that the invention is not limited to the specific forms disclosed, but covers all modifications, changes and alternative constructions and methods falling within the scope of the principles taught by the invention.

I claim:

1. A line amplifier for an electrical transmission system with two four-poles for frequency responsive amplifier network connected in a feedback path between the input and output of amplifier and determining the general frequency characteristic of the amplification comprising, an adjusting member including a magnetic field-dependent semiconductor resistor mounted with one side connected to the output of the first four-pole and to the input of the second four-pole and the other side connected to ground potential composed of an oriented solidified eutectic mixture of indium antimonide-nickel antimonide and having a given n-doping providing a conductivity between 180 ohm-cm. and 600 ohm-cm.

References Cited

UNITED STATES PATENTS

| | | | |
|---|---|---|---|
| 2,828,450 | 3/1958 | Pinckaers | 307—88.5 |
| 2,925,559 | 2/1960 | De Sautels | 330—23 |
| 3,281,749 | 10/1966 | Weiss | 307—88.5 |

ROY LAKE, *Primary Examiner.*

LAWRENCE J. DAHL, *Assistant Examiner.*

U.S. Cl. X.R.

330—26